J. P. SMITH.
Improvement in Combined Corn Sheller and Straw Cutter.
No. 125,415. Patented April 9, 1872.
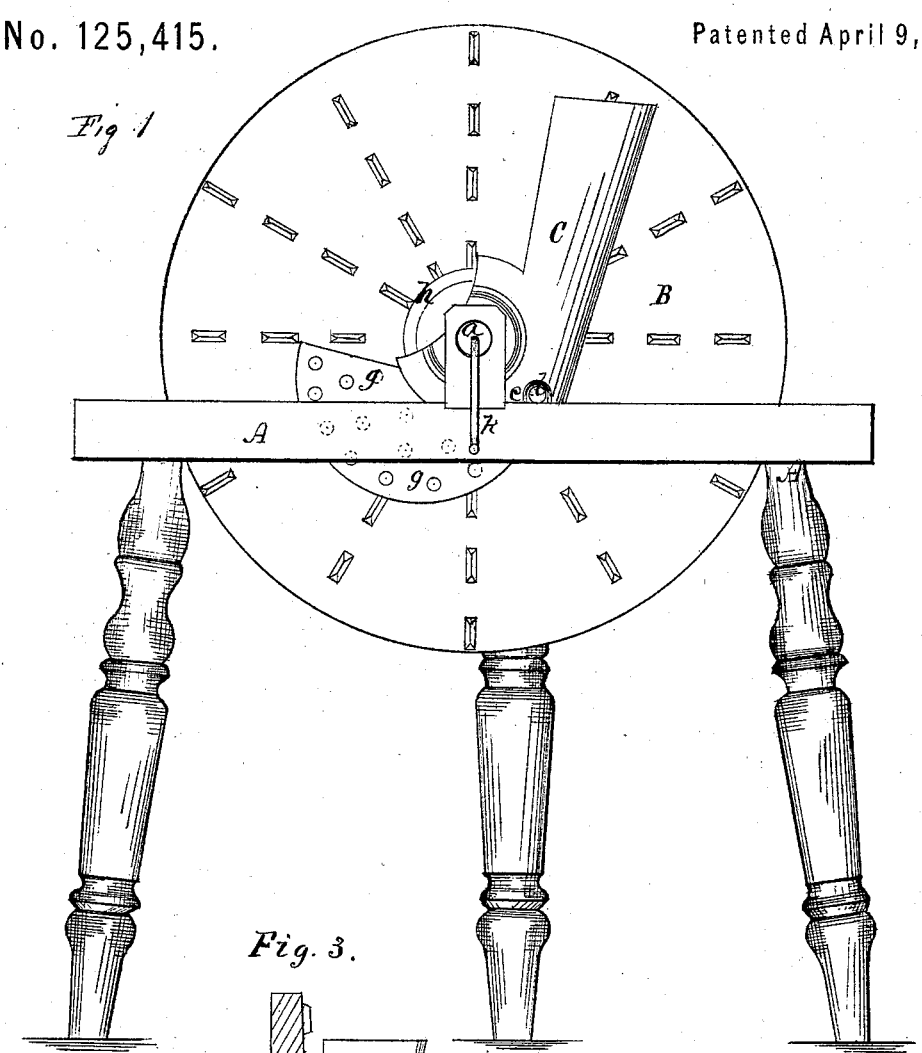
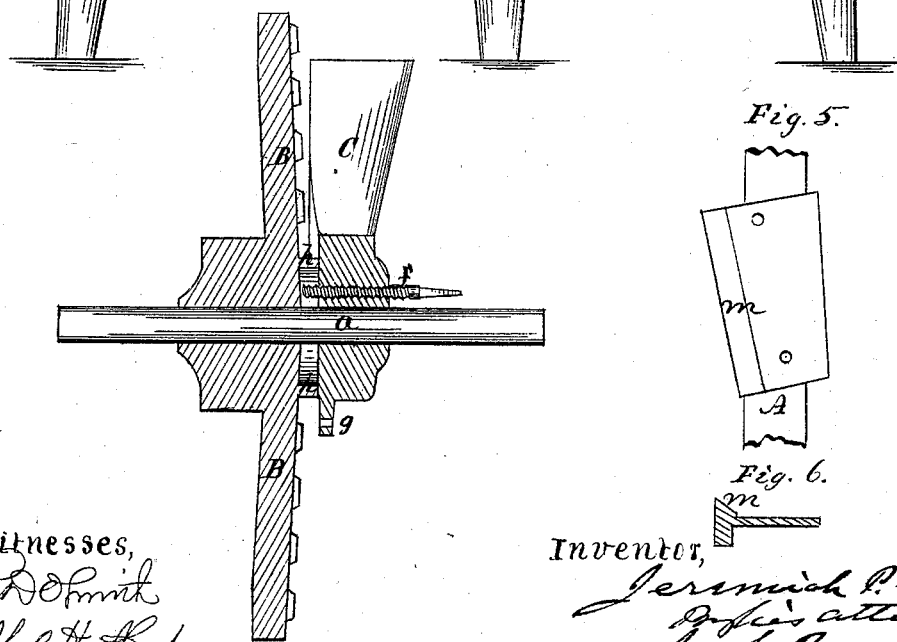
Witnesses,
Inventor, J. P. SMITH.
Improvement in Combined Corn Sheller and Straw Cutter.
No. 125,415.
Patented April 9, 1872.

Witnesses

Inventor,

UNITED STATES PATENT OFFICE.

JEREMIAH P. SMITH, OF SCHUYLKILL HAVEN, PENNSYLVANIA.

IMPROVEMENT IN COMBINED CORN-SHELLERS AND STRAW-CUTTERS.

Specification forming part of Letters Patent No. 125,415, dated April 9, 1872.

*To all whom it may concern:*

Be it known that I, JEREMIAH P. SMITH, of Schuylkill Haven, in the county of Schuylkill and State of Pennsylvania, have invented Improvements in Combined Corn-Shellers and Straw-Cutters; and I do hereby declare that the following is a full and exact description thereof, reference being had to the accompanying drawing making part of this specification—

Figure 2:
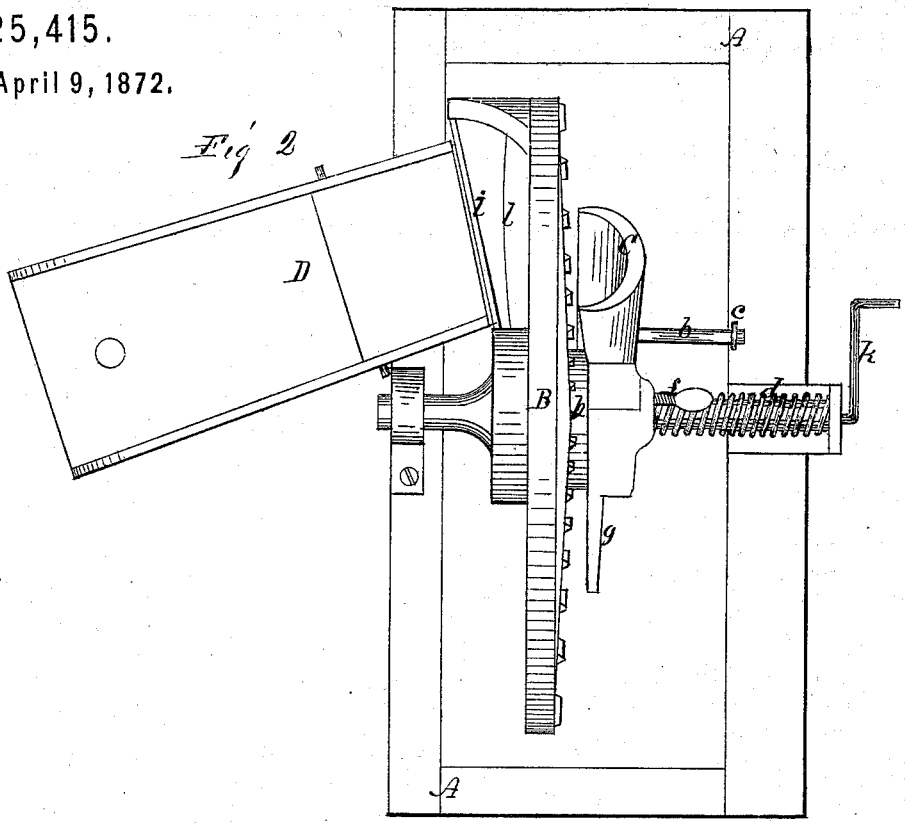
Figure 4:
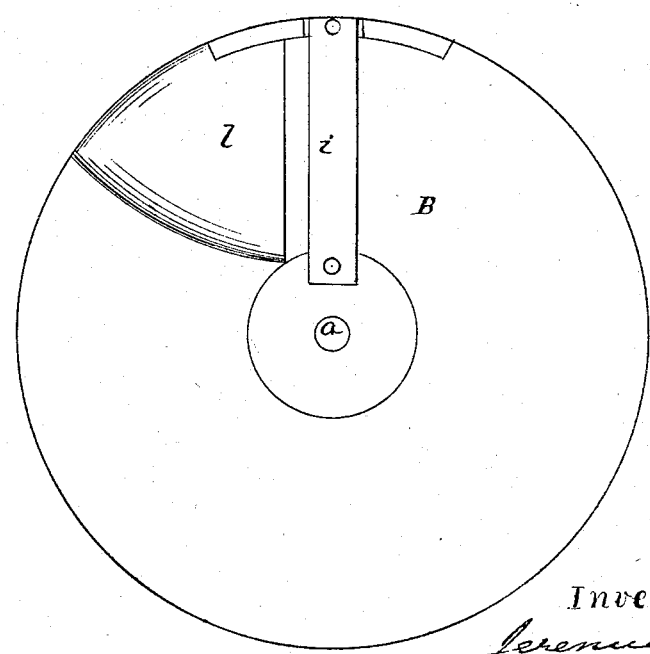

Figure 1 being a side elevation of the improved machine; Fig. 2, a top view of the same; Fig. 3, a central vertical section of the sheller and cutter-wheel in a plane cutting in the line of its axis, the section also cutting through the shelling-tube or concave; Fig. 4, a view of the cutter side of the wheel; Figs. 5 and 6, views of parts detached.

Like letters designate corresponding parts in all of the figures.

Let A represent the bench or frame on which the operative parts of the machine are mounted; B, the sheller and cutter-wheel; C, the sheller-tube or concave; and D, the cutter-box or trough.

The nature of my invention consists in the several specific devices in combined corn-sheller and straw-cutter, as hereinafter set forth.

Upon the sheller side of the wheel B are shelling-teeth or projections of any suitable form and arrangement. The sheller-tube or concave C slides toward and from the sheller-wheel upon the shaft $a$ of the wheel; and it has a guide-rod, $b$, parallel with the said shaft and sliding in a loop or guide-bearing, $c$, on the frame A, to keep it in proper position. It is pressed toward the sheller-wheel by a coiled spring, $d$, on the wheel-shaft $a$, or by equivalent means, so that an elastic and yielding pressure is produced for holding the ears of corn to the sheller-wheel. There is an adjusting-screw, $f$, passed through the shelling-concave C, parallel with the wheel-shaft $a$ and as closely thereto as practicable, and bearing at its inner end against the hub or face of the sheller-wheel B, so that by turning it further in or out the inner limit or least distance to which the concave can be pressed toward the sheller-wheel by the spring $d$ may be adjusted to suit different sizes of the ears of corn. By this adjustment the sheller is perfectly adapted either to southern corn, the ears of which are of large diameter, or to the smallest northern or Canada corn, the ears of which are of small diameter. The first feature of my improvement consists in a perforated sector or semi-circular extension, $g$, of the concave C, laterally from the lower end thereof, under the sheller-wheel shaft, and parallel or nearly parallel with the face of the wheel. The object of this extension is to carry the cobs around so as to be discharged away from the shelled corn, and also to completely shell off any grains of corn that may still remain on the cobs after passing down the shelling-tube. The perforations serve to roughen the surface, and thereby afford sufficient resistance to act effectually on the cobs without impeding their lateral motion along its surface, and also to allow the escape of grains of corn. In combination with the above, my next feature of improvement consists in a projecting flange or annular projection, $h$, on the face of the sheller-wheel, concentric with its axis, and extending outward to or nearly to the concave, for the purpose of keeping the cobs sufficiently far from the center of the wheel to cause them to be discharged laterally from beneath the concave extension, and prevent their being carried up and around again with the sheller-wheel. Upon the cutter side of the wheel B there is a cutter-knife, $i$, (or two or more knives, if desired,) extending from the hub of the wheel—say from four to ten inches—toward the periphery of the wheel, or even to the periphery, if preferred. The next specific feature of improvement consists in the arrangement of the knife or knives $i$ obliquely to the face of the wheel, the outer end thereof being further from the face of the wheel than the inner end or the end next to the wheel-shaft. The object of this arrangement is to enable the cutter-box D to be placed obliquely to the frame A of the machine, so that the attendant may feed in the hay and straw with one hand while turning the crank $k$ of the wheel with the other hand. Another feature of improvement consists in a gauge projection, $l$, on the face of the wheel, in front of the knife $i$, inclined on its front face and abrupt at its rear edge beneath the knife, the distance between its greatest projection and the knife being equal to the length of cut desired to be made of the hay or straw. Thus, while the hay or straw is simply moved toward the wheel, this projection serves as a gauge without holding the hay and straw in constant contact with the wheel, thereby avoiding unnecessary friction. The cutting-box D is removable from the bench or frame of the machine, so as not to be in the way when shelling corn. The stationary cutting-strip m, which holds the hay or straw for the knife i to cut or shear by, remains attached to the frame or bench A when the cutting-box is removed. Another improvement consists in the construction of this stationary strip as thus arranged, so that no grains of corn will become lodged on its cutter-edge and render the knife liable to be broken or its edge dulled thereby. To effect this purpose the upper surface of the strip is leveled or inclined, as shown in Fig. 6, so that no grains of corn can remain thereon.

What I claim as my invention, and desire to secure by Letters Patent, is—

1. The wheel B, having shelling-teeth on one face and a hay or straw knife or knives on the other face, in combination with the shelling-concave C and cutting-box D, substantially as and for the purposes herein specified.

2. The perforated concave extension g, in combination with the sheller-wheel B, as and for the purpose herein set forth.

3. The annular projection or flange h, in combination with the concave extension g, as and for the purpose herein specified.

4. The straw-cutter knife or knives i, when its edge is arranged in a position inclined to the face of the wheel, in the manner and for the purpose herein specified.

5. The inclined gauge-projection l on the wheel B, in combination with the knife i, substantially as and for the purpose herein specified.

6. The combination and arrangement of the removable cutting-box D, stationary cutting-strip m having an inclined upper surface, and the cutter and sheller-wheel B, as specified.

Specification signed by me this 9th day of December, 1870.

JEREMIAH P. SMITH.

Witnesses:
  E. M. HOPPER,
  ABNER HUMMEL.